Feb. 28, 1956   J. A. HARDMAN   2,736,156
COUNTERBALANCED DRIVE MECHANISM FOR RECIPROCATING CUTTERS
Filed Jan. 28, 1953   3 Sheets-Sheet 1

INVENTOR.
James A. Hardman
BY Harold T. Stowell

ATTORNEY

Feb. 28, 1956     J. A. HARDMAN     2,736,156
COUNTERBALANCED DRIVE MECHANISM FOR RECIPROCATING CUTTERS
Filed Jan. 28, 1953     3 Sheets-Sheet 2

INVENTOR.
James A. Hardman
BY Harold T. Stowell
ATTORNEY

Feb. 28, 1956   J. A. HARDMAN   2,736,156
COUNTERBALANCED DRIVE MECHANISM FOR RECIPROCATING CUTTERS
Filed Jan. 28, 1953   3 Sheets-Sheet 3
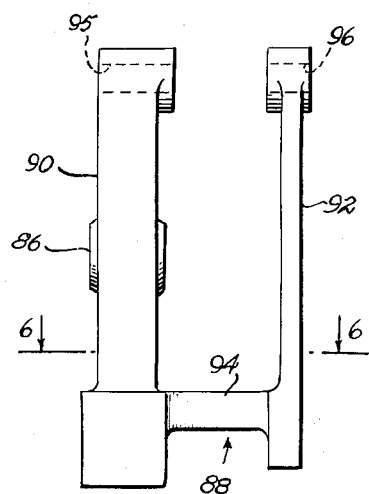
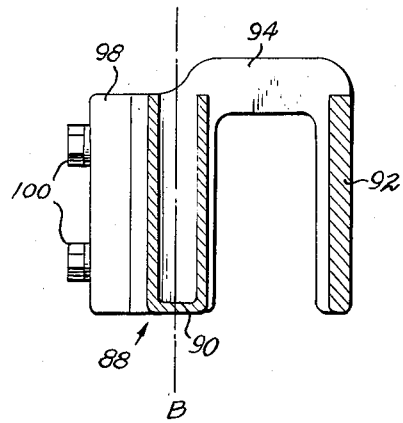
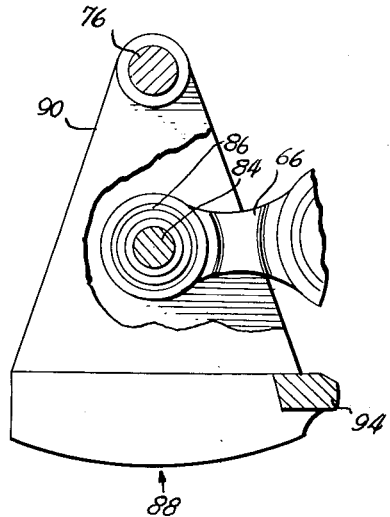
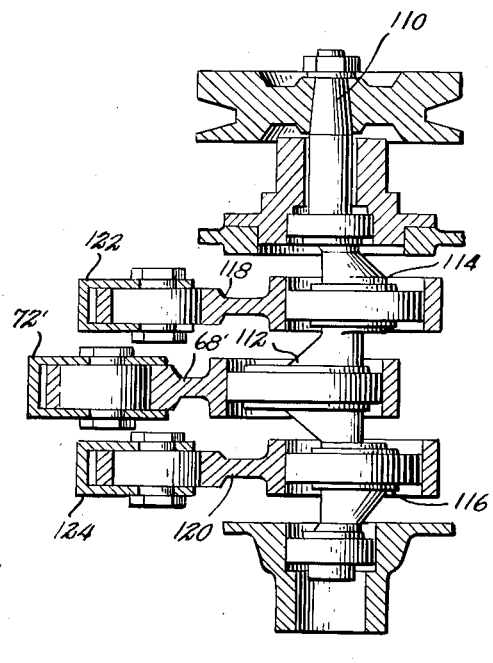
INVENTOR.
James A. Hardman
BY Harold T. Stowell
ATTORNEY United States Patent Office 2,736,156
Patented Feb. 28, 1956

2,736,156
COUNTERBALANCED DRIVE MECHANISM FOR RECIPROCATING CUTTERS

James Abraham Hardman, Logan, Utah, assignor to Utah Scientific Research Foundation, Logan, Utah, a corporation of Utah Application January 28, 1953, Serial No. 333,769

8 Claims. (Cl. 56—296)

This invention relates to an improved balanced drive mechanism for oscillatory devices.

It is an object of the invention to provide an improved balanced drive mechanism for oscillatory devices wherein the mechanical components are arranged for smooth, efficient, and economical operation.

A further object is to provide such a mechanism that is simple as to its parts, economical to manufacture, and in which the components are readily accessible for adjustment and repair.

Another object is to provide an improved drive mechanism for oscillatory devices which is balanced both with respect to linear and torque forces.

A further object is to provide a new and improved cutter drive mechanism for reciprocative knife mowers.

Practically all agricultural mowers utilize an elongate, reciprocative knife extending in outward fashion from engagement with drive mechanism adapted to be attached to a tractor. The knife is usually a component part of what is commonly referred to as a cutter or sickle bar assembly, and is slidably disposed with respect to a correspondingly elongate, but non-reciprocative, cutter or sickle bar. The knife is generally made up of a series of forwardly tapered knife sections disposed side by side along the length of the knife, and the cutter or sickle bar of a corresponding series of reaction members, commonly termed ledger plates. Cutting is effected by the reciprocative movement of the series of knife sections relative to the ledger plates and within a slideway defined by specially provided wear or guide plates.

The drive mechanism for reciprocating the knife within the cutter or sickle bar assembly ordinarily includes a so-called pitman arrangement, which consists of a long rod extending from reciprocative connection with a rotary drive, located at the power take-off of the tractor, to a ball and socket connection with the knife, disposed well above the cutting level of the latter. The ball is customarily attached to the knife by means of a rigid and relatively heavy, forged steel arm. This combination of ball and arm is known as a "knife head," and is ruggedly designed to resist the considerable stresses and strains imposed upon the knife and its mounting during use of the machine.

This conventional pitman drive arrangement is disadvantageous in several respects. It is necessarily heavy in construction, and tends to introduce an up and down motion component to the knife, which is wasteful of power and which results in considerable wear and tear on the guide means provided for knife reciprocation. Furthermore, the momentum of the pitman knife head is unbalanced in the back and forth movement, thereby increasing the waste of power and causing detrimental vibration in the entire machine structure.

The present invention has, as its principal object, the elimination of this conventional pitman drive arrangement, with its inherent disadvantages and difficulties, and the provision of a rationally improved mower construction, in which the mechanical components are arranged for smooth, efficient, and economical operation, are conveniently accessible and adjustable in the field, are subjected to a minimum of wear and tear during use, are substantially balanced at all times to make for vibration-free operation, and are economically feasible from the standpoint of construction and assembly costs.

Other objects are to conserve motive power and eliminate vibration by balancing the construction, so that the drive mechanism will function in compensating opposition to the reciprocative action of the mower knife.

These and other objects and advantages are provided by the balanced drive mechanism for oscillatory devices of the invention which generally comprises a power transmitting member mounted for oscillatory motion, a counterbalance mounted for oscillatory motion in a plane parallel to the plane of motion of the power transmitting member, and drive means connecting the power transmitting member and the counterbalance to a common power source whereby the counterbalance is oscillated in synchronized opposition to the oscillation of the power transmitting member; and by the improved drive for power driven mowing machines which generally comprises a reciprocatory cutter knife, a power transmitting member pivotally secured to the cutter knife, and a counterbalance, an axle pivotally mounting the power transmitting member and the counterbalance for oscillatory motion in parallel planes, and drive means connecting the power transmitting member and the counterbalance to a common power source whereby the counterbalance is oscillated in synchronized opposition to the oscillation of the power transmitting member and its connected cutter knife.

The invention will be more particularly described with reference to power driven mowing machines, or mowers which are customarily attached to farm tractors for the cutting of forage and standing crops, and with reference to the accompanying drawings in which:

Fig. 5 is an elevational view of the counterbalance apart from the drive mechanism;

Fig. 6 is a sectional view on line 6—6 of Fig. 5;

Fig. 7 is a fragmentary vertical secton on line 7—7 of Fig. 2, portions having been broken away and with members in the background omitted for clarity; and Fig. 8 is a view similar to Fig. 3 showing a modified form of the device.

Figure 1:
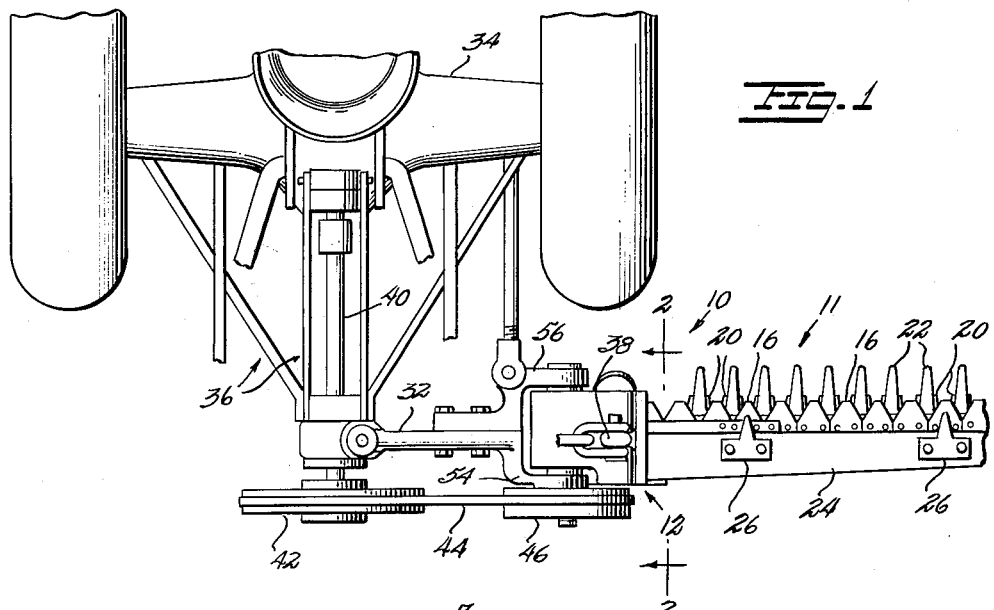
Fig. 1 is a fragmentary top plan view of a tractor powered mower embodying the principles of the invention.
Figure 4:
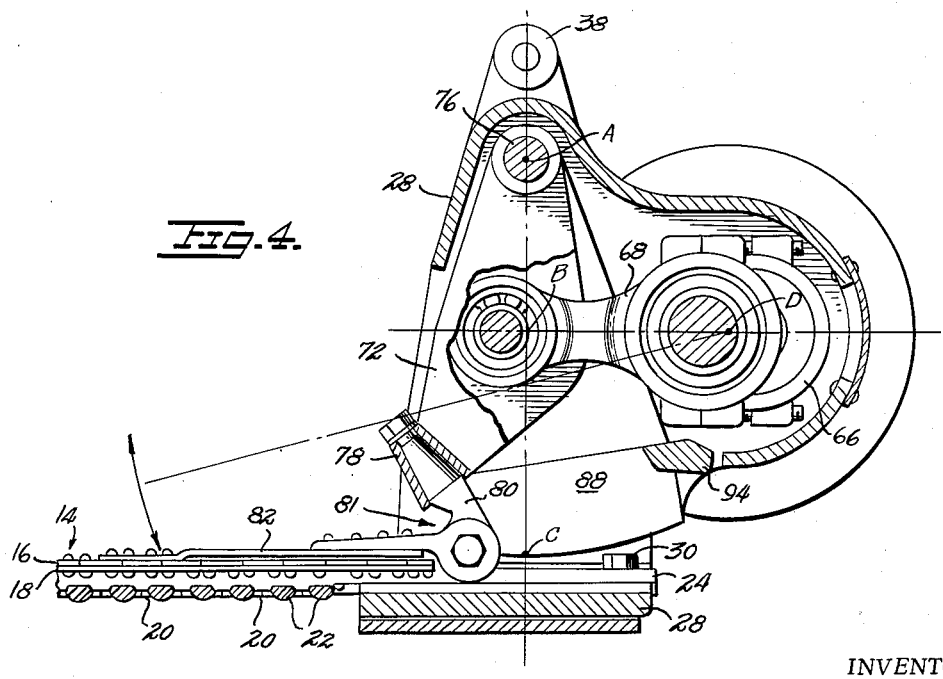
Fig. 4 is a vertical section on line 4—4 of Fig. 2 with parts broken away.

With reference to the drawing, and in particular to Figs. 1 and 4, 10 is a mower in which the invention is embodied. The mower generally comprises a sickle bar assembly 11 and a balanced motion transforming mechanism 12.

The cutter bar assembly generally comprises an elongated reciprocating knife or sickle 14, having a series of forwardly tapered shear blades 16, secured in side-by-side relationship to a foundation bar 18. The shear blades coact with complementary non-reciprocating ledger plates 20. The ledger plates are secured to respective U-shaped guard members 22, which project forwardly of the machine and are rigidly fastened to the forward edge of the sickle bar platform 24. Cutting is effected by the reciprocative movement of the sickle 14 relative to the ledger plates 20 and within slideways defined by specially provided wear or guide plates 26.

Figure 2:
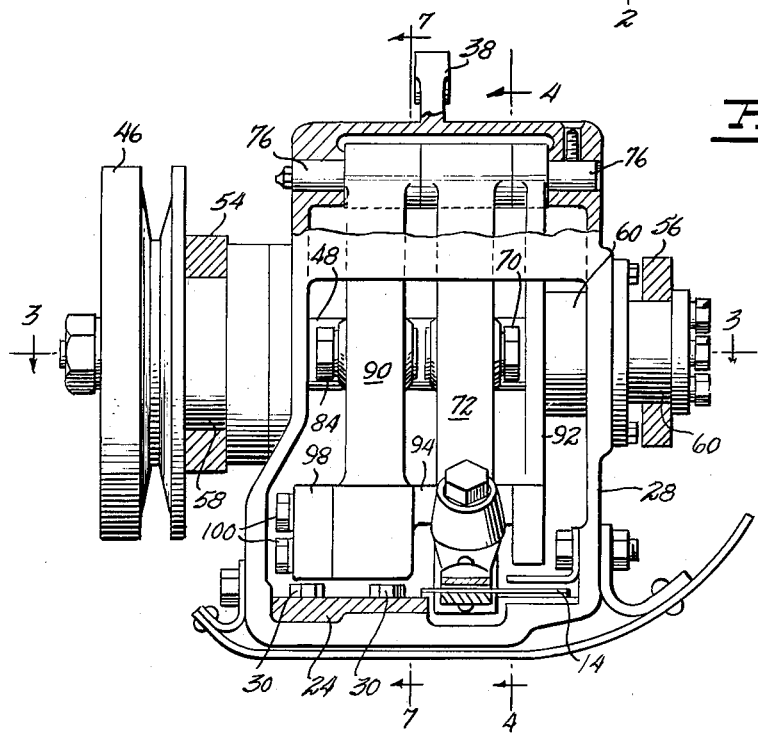
Fig. 2 is an enlarged sectional view taken along line 2—2 of Figure 1 with parts broken away and shown in section.
Figure 3:
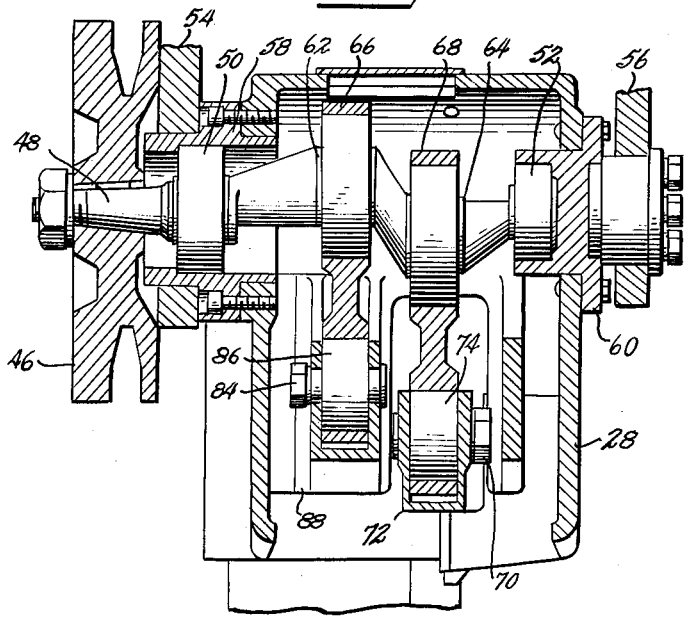
Fig. 3 is a horizontal section on line 3—3 of Fig. 2.

The sickle bar platform 24 is secured to the housing 28 of the motion transforming mechanism by bolts 30, as shown in Figs. 2 and 4.

The housing 28 and its attached sickle bar assembly is pivotally secured, as is fully described hereinafter, to a bifurcated radius bar 32. The radius bar 32 is in turn secured to a source of motive power such as the tractor 34, by supporting framework 36. A lug 38 is provided on the upper surface of the housing 28, to which is attached suitable manually or power operated mechanism, not shown in the drawings, for pivoting the housing 28 and its attached sickle bar assembly about the pivotal connection between the housing 28 and the bifurcated arms of the radius bar 32, as is well known in the mower art. The tractor 34 has a rearwardly extending power takeoff shaft 40 which is journalled near its outboard end in bearings carried by the framework 36. A pulley 42, which is keyed to the power takeoff shaft 40, is connected by a drive belt 44 to a combination pulley and fly wheel 46 which drives the reciprocating sickle 14 of the mower through the novel drive mechanism which transforms the rotary motion of the pulley 46 into smooth balanced oscillatory motion.

In order to transform rotary motion into balanced oscillatory motion to drive reciprocating or oscillatory devices, at least two primary factors must be considered: first, the reciprocating element must be counterbalanced with respect to linear forces, and secondly, the effective mass of the counterbalance and the mass of the reciprocating element should be centered in a common plane to minimize transverse torque. It has been found that, by pivotally connecting a device to be reciprocated to a power transmitting member mounted for oscillatory motion, by mounting a counterbalance member having a distributed mass equivalent to the mass of the reciprocating device and its connected power transmitting member for oscillatory motion in a plane parallel to the plane of motion of the power transmitting member and its connected device, and by drivably connecting the power transmitting member and the counterbalance to a common power source whereby the counterbalance is oscillated in synchronized opposition to the oscillation of the power transmitting member, the elements will be balanced with respect to linear forces.

It has further been found that when the mass of the counterbalance is distributed in parallel planes on both sides of the plane of motion of the power transmitting member and its connected device so that the effective mass of the counterbalance is centered in the plane of oscillation of the power transmitting member, the development of transverse torque between the oscillatory elements will be minimized.

While the form of construction and the relative position of the power transmitting member and the counterbalance may vary, and various types of drive means therefor may be used, one form of construction for distributing the mass of the counterbalance in parallel planes on both sides of the plane of motion of the power transmitting member is through the use of two independent and separately driven counterbalances which will be described in detail hereinafter in reference to Fig. 8 of the drawings. However, a preferred form of the balanced drive mechanism employs a single bifurcated or U-shaped counterbalance having a single power take-off. This form of the invention is shown in detail in Figs. 2 through 7, and presents a highly efficient, novel advancement in the art, and substantially reduces the cost of manufacture of the drive mechanism of the present invention. With reference to the drawings, the pulley and flywheel 46 is keyed to a crankshaft 48 journalled in the housing 28 by means of anti-friction bearings 50 and 52. The bifurcations 54 and 56 of the radius rod 32 are journalled to sleeves 58 and 60, respectively, which sleeves support the main crankshaft bearings 50 and 52. The crankshaft is provided with two opposed cranks 62 and 64 to which are journalled one end of connecting rods 66 and 68, respectively. The other end of connecting rod 68 is connected through anti-friction bearing 74 to pin 70 carried by a power transmitting member 72. The upper end of the power transmitting member 72 is pivotally suspended from fixed pivot shaft 76 mounted in the upper part of housing 28, as clearly shown in Figs. 2 and 4 of the drawings. At the lower end of the power transmitting member 72 is provided a conical coupling adapted to receive a complementary coupling 80. The coupling 80 forms one part of a wrist joint 81 which couples the power transmitting member 72 to the reciprocating sickle 14 through a leaf spring 82.

The other end of connecting rod 66 is connected to pin 84 through anti-friction bearing 86 carried by a counterbalance 88. The counterbalance, as more clearly shown in Figs. 4, 5, 6, and 7, is substantially U-shaped, having leg portions 90 and 92 which are rigidly joined together at one set of ends thereof by a transverse tie member 94. The other ends of leg portions 90 and 92 are bored to receive and form bearing surfaces 95 and 96 for the fixed pivot shaft 76. Additional or auxiliary masses of varying weights may be attached to the counterbalance, such as indicated at 98 (Figs. 2 and 6), for example by cap screws 100. Thus, as shown in the drawings, the power transmitting member 72 and the U-shaped counterbalance 88 are each pivotally suspended for oscillatory motion in parallel planes from a common pivot shaft, and are driven in synchronized opposition by a common drive shaft. By the use of the U-shaped counterbalance the effective mass of the counterbalance may be centered in the plane of oscillation of the power transmitting member 72 to minimize torque transverse to the planes of oscillation of the counterbalance and the power transmitting member. However, it has been found that on agricultural mowers, to center the effective reciprocating mass in the plane of the power transmitting member, an excessive load would have to be carried on the journal 96. In practice, therefore, a comprise is establised and an admissible couple is introduced to diminish the loads on bearings 96 and 95.

It has further been found that on mowers having a seven-foot knife very satisfactory results are obtained when the total mass is equally distributed on both sides of a vertical plane passing through the center of bearing 86 and line B—B, Figs. 5 and 6.

In operation of the mower, rotation of the crankshaft 48, by reason of its drive connection with the power takeoff shaft of the tractor, will impart opposed oscillatory motion directly to the power transmitting member 72 and the counterbalance 88, respectively, through respective cranks 64 and 62 and connecting rods 68 and 66.

Oscillation of the power transmitting member will cause the wrist joint 81 to travel through an arc centered in the power transmitting suspension shaft or pin 76. However, instead of imparting an upward force component to the cutter knife, as in the case of conventional knife drive arrangements, articulation of the wrist joint will merely cause the resilient leaf spring 82 to flex slightly away or toward the mower knife during the reciprocative movement thereof. The resilient connection between the cutter knife and the balanced drive mechanism further minimizes vibration during operation of the machine, and greatly reduces wear in and damage to the entire cutter bar assembly.

The development of transverse torque in the operation of the improved drive of the invention may also be minimized by distributing the mass of the counterbalance in parallel planes on both sides of the plane of motion of the power transmitting member without the use of a tie bar connecting these masses. Such a modification is illustrated in Fig. 8. In this form of the invention a three-crank crankshaft 110 is employed. The center crank 112 is connected to the power transmitting member 72' through connecting rod 68', while cranks 114 and 116 serve to opposingly drive, through connecting rods 118 and 120, separate counterbalances 122 and 124, respectively. The counterbalances each have a mass equal to substantially one half the mass of the power transmitting member and its connected device. The counterbalances 122 and 124 and the power transmitting member are pivotally supported from a fixed pivot shaft as hereinbefore described in reference to Figs. 2 through 8, and the reciprocating member of the sickle bar assembly may be connected to the power transmitting member through a similar wrist joint and leaf spring. It will thus be seen that in this form of the invention the linear forces are balanced by the use of counterbalances which oscillate in synchronized opposition to the oscillation of the power transmitting member and its connected device, and the transverse torque is minimized by the use of separate counterbalances positioned on both sides of the plane of motion of the power transmitting member, the effective masses of the counterbalances being balanced with respect to the plane of oscillation of the power transmitting member and its connected device.

From the foregoing description of the three-crank balanced drive mechanism shown in Fig. 8 it will be seen that while this form of the invention accomplishes the aims, objects, and advantages of the invention, the cost of constructing the three-crank balanced drive with its additional bearings and machined elements renders it a substantially more expensive arrangement than the form of the invention shown and described with reference to Figs. 2 through 7.

In the construction of either form of the invention it has been found that most satisfactory results are obtained when the axis of oscillation of the power transmitting member, the pivot axis of the connection of the connecting rod thereto, and the pivot axis of articulation of the wrist joint lies on a straight line, and the line through the pivot axis of the connecting rod connection with the crankshaft and the axis of rotation of the crankshaft is substantially perpendicular to said straight line at the mid-point of the arc described by the oscillatory power transmitting member in operation.

The foregoing form of construction is geometrically shown with reference to Fig. 4 wherein points A, B, and C on line A—C designate respectively the axis of oscillation of the power transmitting member, the pivot axis of the connection of the connecting rod thereto, and the pivot axis of articulation of the wrist joint; and points B and D on line B—D designate respectively the pivot axis of the connecting rod with the power transmitting member and the axis of rotation of the crankshaft.

Further in reference to Fig. 4, it will be seen that point D on line B—D is also the pivotal axis of the housing 28, its balanced motion transforming mechanism, and the entire sickle bar assembly 11, about the bifurcated radius bar 32. Therefore, as the outer end of the sickle bar assembly is raised or lowered to cut on banks or in depressions the entire assembly merely pivots about point D as shown by the arrows in Fig. 4. The knife will therefore remain in a predetermined register with respect to the stationary ledger plates in all positions of the sickle bar assembly.

This aspect of the present invention is of substantial importance as it eliminates a considerable amount of vibration and inertia force by reducing the required knife blade stroke. On the conventional mowers using the pitman drive, the cutter knife changes its position relative to the stationary ledger plates as a result of changes in the elevation of the outer end of the swathboard. For example, if the swathboard is raised, the knife will operate in a range outwardly of exact register with the ledger plates. In order to compensate for this change in register, most conventional mowers are designed so that the knife over-runs the ledger plates by approximately three-eighth of an inch, on a three-inch stroke. On mowers constructed in accordance with the teachings of the present invention it has been found with a blade stroke of only two and one-half inches the mowing machine will cut equally well, as far as the cutting operation is concerned, at substantially any angle of the cutter bar.

From the foregoing description it will be seen that the present invention provides a new and improved balanced drive mechanism for oscillatory devices whereby the aims, objects, and advantages of the invention are fully accomplished.

It will be evident that various modifications may be made in the construction, form, and use of the balanced drive.

I claim:

1. In a power-driven mowing machine the combination of a reciprocating cutter knife and balanced oscillatory drive means therefor comprising a housing, a power transmitting member, means pivotally mounting the power transmitting member for oscillatory motion in the housing, a counterbalance means pivotally mounting the counterbalance for oscillatory motion in the housing in a plane parallel to the plane of motion of the power transmitting member, a crank shaft having opposed cranks mounted in the housing, a crank arm connecting the power transmitting member and one of the crank throws, a crank arm connecting said counterbalance and the other crank throw whereby said counterbalance is oscillated in synchronized opposition to the oscillation of the power transmitting member when the crank shaft is rotated, and means connecting the power transmitting member to the cutter knife.

2. The invention defined in claim 1 wherein the power transmitting member and the counterbalance are both pivotally mounted on an axle carried by the housing.

3. The invention defined in claim 1 wherein the counterbalance is bifurcated and the power transmitting member is mounted between the bifurcations thereof.

4. A balanced drive mechanism for oscillatory devices, a housing, a power transmitting member, means pivotally mounting the power transmitting member for oscillatory motion in the housing, a counterbalance, means pivotally mounting the counterbalance for oscillatory motion in the housing in a plane parallel to the plane of motion of the power transmitting member, a crank shaft having opposed cranks mounted in the housing, a crank arm connecting the power transmitting member and one of the crank throws, a crank arm connecting said counterbalance and the other crank throw whereby said counterbalance is oscillated in synchronized opposition to the oscillation of the power transmitting member when the crank shaft is rotated.

5. The combination as defined in claim 1 wherein the mass of said counterbalance is distributed in parallel planes on both sides of the plane of motion of the power transmitting member to minimize transverse torque.

6. The combination as defined in claim 1 wherein the effective mass of said counterbalance is centered in the plane of motion of the power transmitting member to minimize transverse torque.

7. A balanced drive mechanism as defined in claim 4 wherein the mass of said counterbalance is distributed in parallel planes on both sides of the plane of motion of the power transmitting member to minimize transverse torque.

8. A balanced drive mechanism as defined in claim 4 wherein the effective mass of said counterbalance is centered in the plane of motion of the power transmitting member to minimize transverse torque.

References Cited in the file of this patent

UNITED STATES PATENTS

| Number | Name | Date |
|---|---|---|
| 2,130,795 | Gollnick | Sept. 20, 1938 |
| 2,324,563 | Custenborder | July 20, 1943 |
| 2,345,383 | Curtis | Mar. 28, 1944 |
| 2,428,924 | Albertson | Oct. 14, 1947 |
| 2,616,234 | Love | Nov. 4, 1952 |
| 2,619,839 | Love | Dec. 2, 1952 |